United States Patent
Yuan et al.

(10) Patent No.: US 7,557,356 B2
(45) Date of Patent: Jul. 7, 2009

(54) CAMERA-BASED X-RAY DIGITAL IMAGE DETECTOR

(75) Inventors: Xianglong Yuan, Fremont, CA (US); Shifan Cheng, Dublin, CA (US); Yi-Qun Li, Danville, CA (US)

(73) Assignee: Intematix Corporation, Fremont, CA (US)

( * ) Notice: Subject to any disclaimer, the term of this patent is extended or adjusted under 35 U.S.C. 154(b) by 0 days.

(21) Appl. No.: 11/999,729

(22) Filed: Dec. 6, 2007

(65) Prior Publication Data

US 2008/0197290 A1 Aug. 21, 2008

Related U.S. Application Data

(60) Provisional application No. 60/873,817, filed on Dec. 6, 2006.

(51) Int. Cl.
  *G01T 1/20* (2006.01)
(52) U.S. Cl. .................................. 250/370.11
(58) Field of Classification Search ...............................
  250/370.01–370.15, 363.02, 483.1; 378/98.8, 378/98.9, 98.3, 98.2, 99; 600/424; 358/111; 128/653, 659
  See application file for complete search history.

(56) References Cited

U.S. PATENT DOCUMENTS

| | | | | |
|---|---|---|---|---|
| 4,517,594 A | * | 5/1985 | Horbaschek | 378/98.7 |
| 5,216,250 A | * | 6/1993 | Pellegrino et al. | 250/370.09 |
| 5,521,386 A | * | 5/1996 | Taboada | 250/363.02 |
| 6,281,506 B1 | * | 8/2001 | Fujita et al. | 250/370.09 |
| 7,135,686 B1 | * | 11/2006 | Grady | 250/370.11 |
| 2004/0079890 A1 | * | 4/2004 | Fraser et al. | 250/370.11 |
| 2005/0058352 A1 | * | 3/2005 | Deliwala | 382/232 |

OTHER PUBLICATIONS

Zeman et al., "6 MVp x-ray imaging with a transparent scintillator x-ray detector," 1997, Proceedings of SPIE, vol. 3032, pp. 388-394.*
Roehrig et al., "Flat-panel detector, CCD cameras and electron beam tube based video camera for use in portal imaging,", 1998, Proceedings of SPIE, vol. 3336, pp. 163-174.*
Slump et al., "Z novel x-ray detector with multiple screen-CCD sensors for real-time diagnostic imaging,", 1996, Proceedings of SPIE, vol. 2708, pp. 450-461.*
Gagne et al., "Optically coupled digital radiography: sources of inenfficiency," 2001, Proceedings of SPIE, vol. 4320, pp. 156-162.*
Pititheerapab et al., "X-ray detector with CMOS sensor camera application of calcium density measurement," Sep. 2006, IEEE, pp. 1141-1144.*

(Continued)

*Primary Examiner*—David P Porta
*Assistant Examiner*—Kiho Kim
(74) *Attorney, Agent, or Firm*—Fliesler Meyer LLP

(57) ABSTRACT

A camera-based x-ray digital image detectors can contain an assembly of a scintillator screen, a wide-angle optical lens or fisheye lens, and a digital image sensor. Images formed by x-ray radiation on the scintillator screen can be projected onto a much smaller area image sensor through a fisheye or super-wide-angle optical lens, hence forming a highly distorted image thereon. Transparent lead-contained glasses or plastics can be utilized to shield image sensor from x-ray damage. Imaging distortion and light falloff caused by the lens optics can be corrected by software algorithms. Sub-millimeter resolution may be achieved with reduced design complexity and substantially lower manufacturing costs.

14 Claims, 5 Drawing Sheets

OTHER PUBLICATIONS

Tornai et al, "Investigation of Micro-Columnar scintillators on an optical fiber coupled compact imaging system", Nuclear Science Symposium Conference Record, 2000 IEEE, vol. 3, Iss., (Oct. 15-20) 2000, pp. 21/19-21/23.*

* cited by examiner

CAMERA-BASED X-RAY DIGITAL IMAGE DETECTOR

CROSS REFERENCE TO RELATED APPLICATION

This application claims benefit of priority to U.S. Provisional application No. 60/873,817, titled "Camera-based x-ray digital image detector," filed Dec. 6, 2006, the specification and drawings of which are incorporated herein by reference in their entirety.

BACKGROUND OF THE INVENTION

1. Field of the Invention

Embodiments of the present invention are directed to an x-ray digital image detector comprising a scintillator screen, a wide-angle lens, a transparent x-ray shield, and an image sensor. The present invention also includes a software correction algorithm to rectify imaging distortion and a light intensity compensation algorithm to compensate for solid angle changes in the received light.

2. Description of the Related Art

Early x-ray digital camera systems utilized a lens/mirror assembly to project an x-ray scintillator screen image onto a commercial charge-coupled device (CCD) sensor that captured the image. However, because of the small dimensions of a typical CCD sensor compared to large scintillator screens, substantial demagnification and light loss meant that such a digital camera system was not a feasible choice in digital radiography. At present, most commercial digital radiography systems use flat panel detectors, comprising either an amorphous silicon TFT panel coupled with a scintillator layer, or an amorphous selenium TFT panel. Only a few systems used a lens/mirror type x-ray camera detector with competitive imaging quality.

While amorphous silicon TFT panels coupled with scintillator layers promise good resolution and high sensitivity, the high manufacturing cost hinders the quick adoption of such an approach to digital radiography. In this invention, a simple camera-based detector system is designed to take advantage of current advances in CCD/CMOS digital image sensor technology, as well as improvements in scintillator screen technology and optical lens designs.

What is needed in the art is an optical assembly that projects x-ray images formed on a scintillator screen directly onto a much smaller image sensor via a fisheye or super-wide-angle lens, while protecting the image sensor with transparent x-ray shielding, and correcting any imaging distortion using a software rectification algorithm. Such a detector would greatly simplify the design complexity of a camera-based x-ray detector, thus substantially reducing manufacturing costs, while maintaining a comparable imaging quality and efficiency.

SUMMARY OF THE INVENTION

Embodiments of the present invention are directed to x-ray digital image detectors comprising a scintillator screen, an optical lens, transparent x-ray shielding, and a digital imaging sensor. Image distortion is corrected with software, specifically an imaging rectification algorithm, and light intensity is compensated in response to changes in the solid angles of the received light.

In one embodiment of the present invention, the x-ray digital image detector comprises a scintillator screen for capturing an x-ray image, a wide-angle lens for transferring the x-ray image from the scintillator screen to a digital image sensor, and an x-ray shield positioned between the scintillator screen and the digital image sensor, for protecting the digital image sensor from damaging x-rays. The digital image sensor may be a charge-coupled device (CCD) and/or a complimentary metal oxide semiconductor (CMOS)-based image sensor.

Embodiments of the present invention include methods of producing a digital image from an x-ray image on a scintillator screen, the method in one embodiment comprising capturing an x-ray image on a scintillator screen, and transferring the x-ray image from the scintillator screen to a digital image sensor via a wide-angle lens. This method further comprises protecting the digital image sensor from damaging x-rays by positioning an x-ray shield between the scintillator screen and the digital image sensor.

The resolution of such an x-ray digital image detector may in some embodiments about one (1) mm, and in other embodiments, submillimeter.

DETAILED DESCRIPTION OF THE INVENTION

Figure 1:
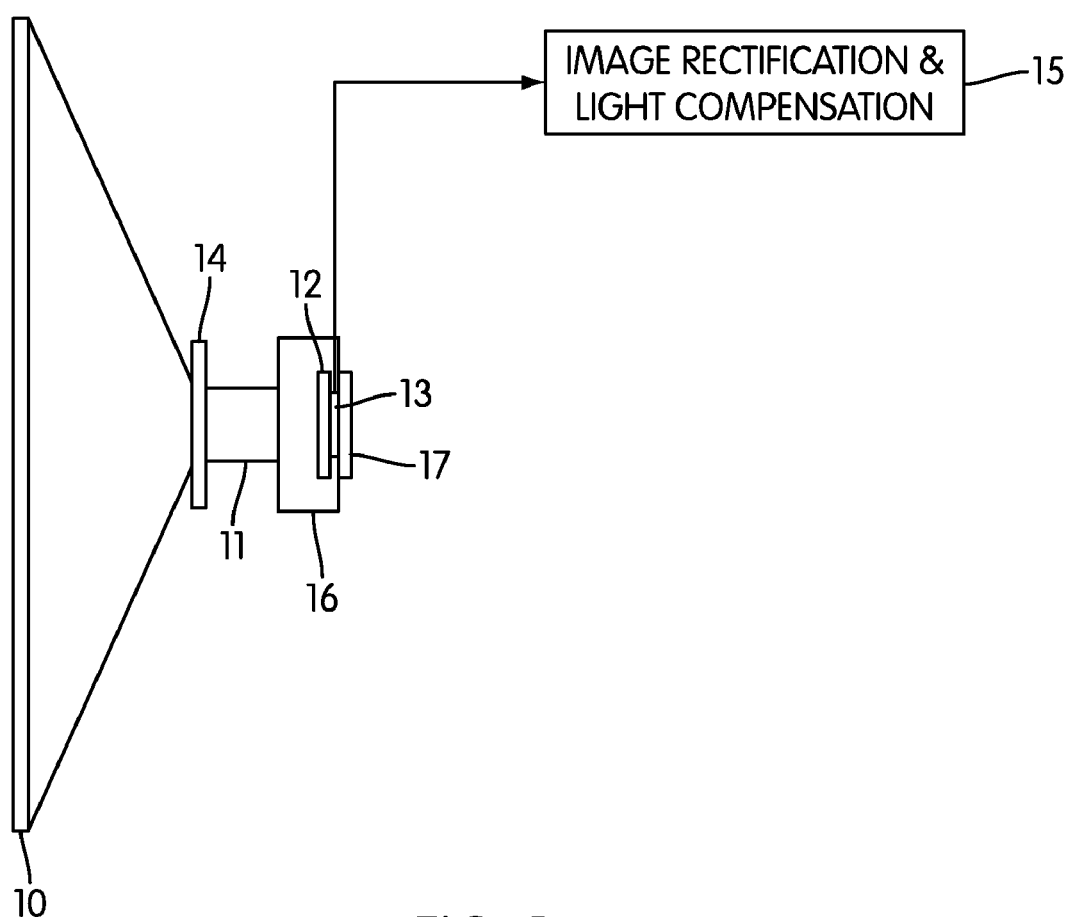
FIG. 1 is a schematic drawing of a camera-based x-ray digital imaging detector.

Disclosed herein is a device comprising a scintillator screen 10, a lens 11, an x-ray shield configured either as shield 12 and/or shield 14, and a digital image sensor 13, as depicted in the schematic diagram of FIG. 1. In contrast to a conventional lens/mirror-type detector, the lens and sensor assembly is placed directly behind the scintillator screen according to the present embodiments. Because the image sensor is then exposed to x-ray radiation, a transparent lead glass/plastic plate is used to protect the image sensor 13 from x-ray radiation damage. In one embodiment, the lead glass/plastic plate 12 is optically coupled with the image sensor 13 to reduce reflective surfaces and minimize light loss. Optionally, a lead glass/plastic plate 14 may be positioned in front of the optical lens (but still behind the screen), leaving the lens/camera assembly intact.

Figure 2:
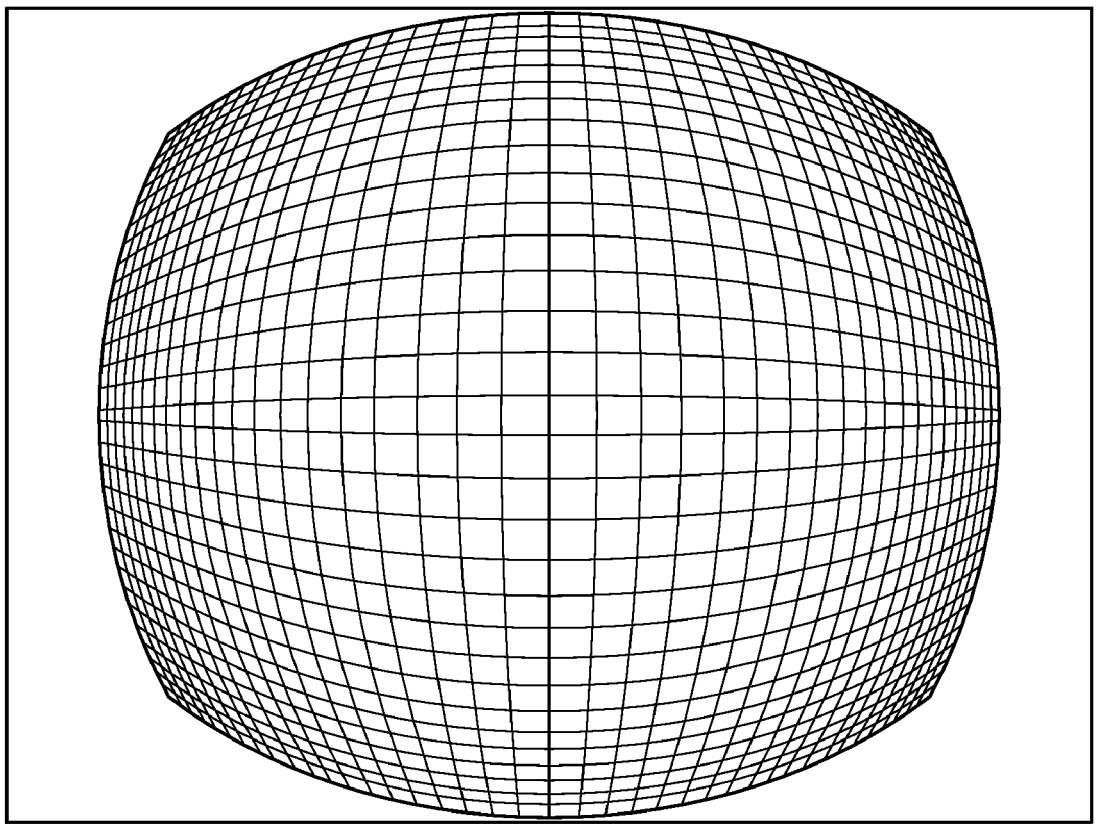
FIG. 2 is a an image formed by an 8 mm fisheye lens before and after imaging rectification performed according to the present embodiments.

In order to reduce the depth of the detector, measured as the distance from the scintillator screen 10 to the image sensor 13, a super-wide-angle lens or a fisheye lens 11 with a large aperture may used, an exemplary image from which is shown in FIG. 2. The image distortion is corrected afterwards using software imaging processing, as shown generally by the image rectification and light compensation system 15 in FIG. 1. Correction may also be made to the light intensity to compensate for any changes in the light intensity as a function of solid angle, the light intensity decreasing from the center of the scintillator screen to the corners. Improvement is further gained with the use of a Peltier cooling plate 17 positioned adjacent to the digital image sensor, and/or using needle-like CsI:Tl scintillator screens. Overall, compatible imaging quality as obtained by commercial available digital radiography systems may be achieved with greatly reduced design complexity and substantially lower manufacturing costs.

Figure 3:
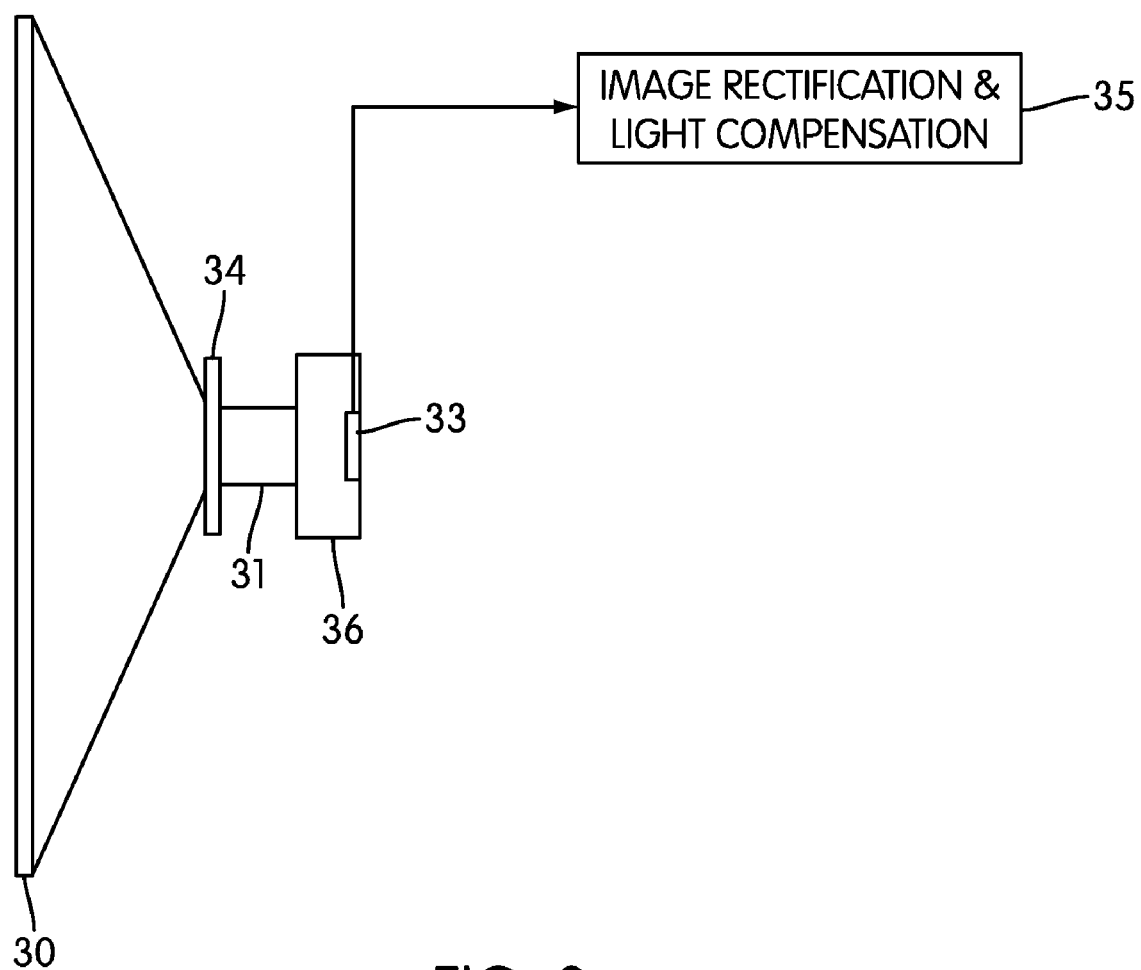
FIG. 3 is a schematic diagram of an x-ray image detector embodied with a commercially available digital camera and fisheye lens.

In one embodiment of the present invention, as shown in FIG. 3, a commercially available full-frame 35 mm digital camera 36 (using a 24 mm×36 mm, 13 million pixel CMOS imaging sensor) with an fisheye lens 31 at the focal length of either 8 mm or 15 mm was positioned directly behind a flat $Gd_2O_2S$:Tl scintillator screen 30, with an effective detecting area of about 300 mm×400 mm. The overall depth of the detector was about 200 mm. A transparent lead plastic panel 34 was placed in front of the lens 31 to shield the camera 36 from x-ray radiation damage. The light exposure sensitivity of the digital camera was set to ISO 1600, and the aperture of the fisheye was set to F3.5.

Figure 4:
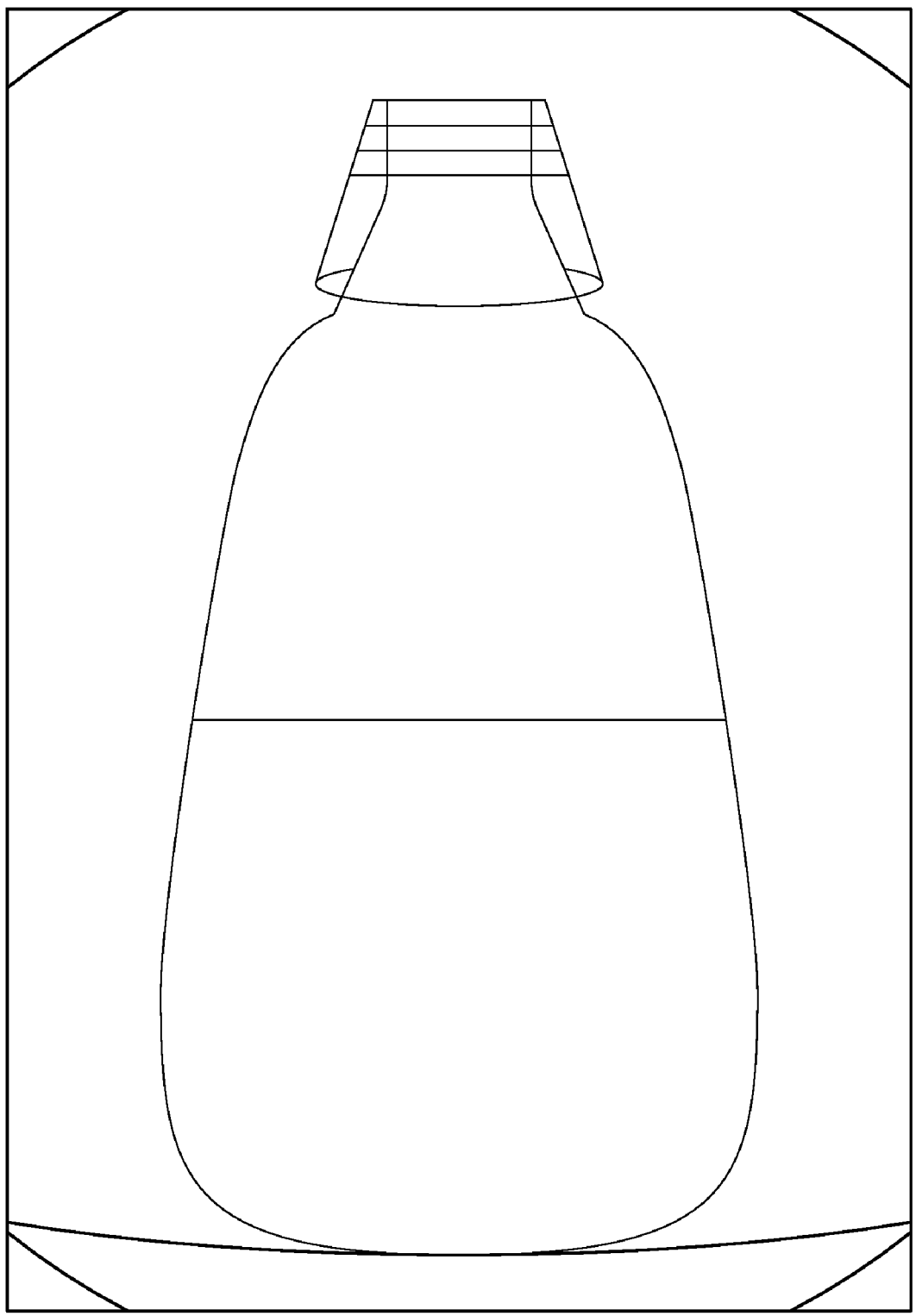
FIG. 4 is an x-ray image of a water bottle containing the cap to the bottle; the x-ray exposure was made at 70 KVP, 7 mA, for 10 msec, and the distance between the x-ray source and the detector screen was about 100 cm.

An exemplary image is shown in FIG. 4, which is an x-ray image of a water bottle obtained with a detector configured as described above. Optionally, imaging could be captured at a frame rate of 3 frames per second using the camera's mechanical shutter. To achieve an optimized overall imaging quality, the focal point of the optical lens may be chosen to be near the edge of the scintillator screen. Software correction for imaging distortion and compensation for light falloff due to solid angle decrease are processed immediately after the images are captured, in a processing system shown generally at reference numeral 35. A one millimeter resolution could be achieved with this configuration.

Figure 5:
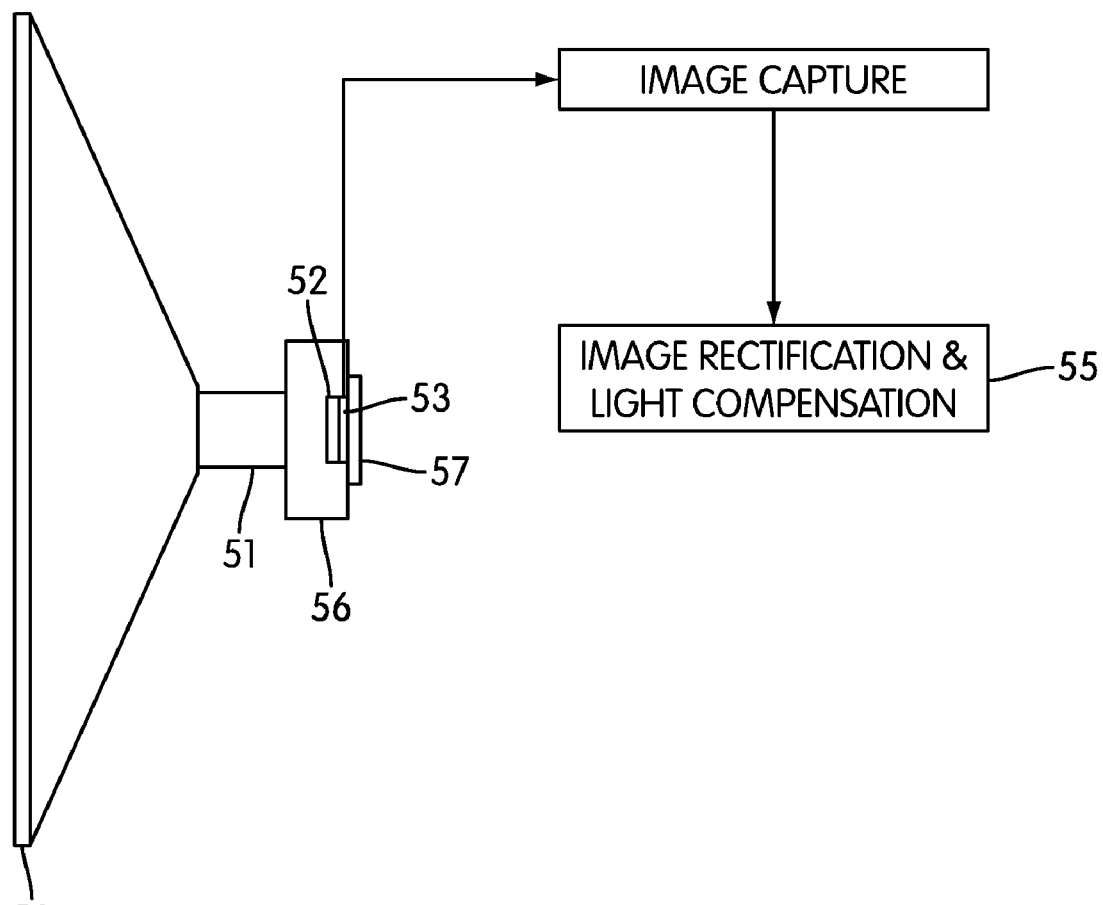
FIG. 5 is a schematic diagram of an x-ray image detector embodied with a fisheye lens, an optically coupled lead-glass-shield, and a Peltier-plate-cooled image sensor.

In another embodiment of the present invention, shown in FIG. 5, a commercial 24 mm×36 mm, 11 million pixel, monochrome CCD imaging sensor 53 is optically coupled to a transparent lead glass plate 52 for shielding damaging x-rays from the CCD imaging sensor 53. The glass plate 52 has a high reflective index that better matches the reflective index of CCD sensor. The thickness of the lead glass plate is chosen to fully shield the sensor from x-ray radiation damage. On the back of the CCD sensor 53 is a Peltier cooling plate 57 to reduce the thermal noise of the CCD sensor. The capture board for the CCD sensor has a binning capability which allows for up to about 9 frames per second for progressively scanned images. The chamber 56 that connects the CCD sensor 53 with a fisheye lens 51 can be optionally sealed and filled with an inert gas such as nitrogen ($N_2$) or argon (Ar) gas. The fisheye lens 51 in this embodiment has a focal length of either 8 mm or 15 mm, and is positioned directly behind a flat needle-structured CsI:Tl scintillator screen 50, with an effective detecting area of about 300 mm×400 mm. The overall depth of the detector is 200 mm. To achieve optimized overall imaging quality, the focal point of the optical lens 51 is chosen to be near the edge of the scintillator screen 50. Software correction for imaging distortion and compensation for light falloff due to solid angle decrease are processed immediately after imaging capture in a system shown generally at reference numeral 53. A sub-millimeter resolution may be achieved with this embodiment.

What is claimed is:

1. An x-ray digital image detector comprising:
 a scintillator screen, for capturing an x-ray image;
 a wide-angle fisheye lens for transferring the x-ray image from the scintillator screen to a digital image sensor; and
 an x-ray shield positioned between the scintillator screen and the digital image sensor, for protecting the digital image sensor from damaging x-rays.

2. The x-ray digital image detector of claim 1, wherein the digital image sensor is selected from the group consisting of a charge-coupled device (CCD) and a complimentary metal oxide semiconductor (CMOS)-based image sensor.

3. The x-ray digital image detector of claim 1, further including a system for providing a software correction algorithm to rectify imaging distortion.

4. The x-ray digital image detector of claim 1, further including a system for providing a light intensity correction algorithm to compensate for changes in the solid angles of the received light.

5. The x-ray digital image detector of claim 1, wherein the fisheye lens has a focal length selected from the group of about 15 mm or less.

6. The x-ray digital image detector of claim 1, further including a chamber for housing the image sensor, and wherein the chamber is filled with an inert gas.

7. The x-ray digital image detector of claim 1, further including a Peltier cooling plate positioned adjacent to the digital image sensor for reducing thermal noise in the digital image sensor.

8. The x-ray digital image detector of claim 1, wherein the scintillator screen is selected from the group consisting of a Gd2O2S:Tl scintillator screen and a needle CsI:Tl scintillator screen.

9. The x-ray digital image detector of claim 1, wherein the distance between the 10 scintillator screen and the digital image sensor is about 200 mm or less.

10. The x-ray digital image detector of claim 1, wherein the detector is configured to have a resolution of about one millimeter.

11. The x-ray digital image detector of claim 1, wherein the detector is configured to have a sub-millimeter resolution.

12. A method of producing a digital image from an x-ray image on a scintillator screen, the method comprising:
 capturing an x-ray image on a scintillator screen;
 transferring the x-ray image on the scintillator screen to a digital image sensor via a wide-angle fisheye lens; and
 protecting the digital image sensor from damaging x-rays by positioning an x-ray shield between the scintillator screen and the digital image sensor.

13. The method of claim 12, further including rectifying image distortion from the digital image sensor using software comprising a correction algorithm.

14. The method of claim 12, further including compensating for changes in the solid angle of the received light.

* * * * *